(12) United States Patent
Weiland

(10) Patent No.: US 10,000,224 B2
(45) Date of Patent: Jun. 19, 2018

(54) HANDLING DEVICE FOR THE MAINTENANCE OF AGITATOR BALL MILLS AND METHOD FOR MAINTAINING AN AGITATOR BALL MILL

(71) Applicant: NETZSCH-Feinmahltechnik GmbH, Selb (DE)

(72) Inventor: Lars-Peter Weiland, Schönwald (DE)

(73) Assignee: NETZSCH-Feinmahltechnik GmbH, Selb (DE)

( * ) Notice: Subject to any disclaimer, the term of this patent is extended or adjusted under 35 U.S.C. 154(b) by 150 days.

(21) Appl. No.: 15/051,141

(22) Filed: Feb. 23, 2016

(65) Prior Publication Data

US 2016/0288810 A1    Oct. 6, 2016

(30) Foreign Application Priority Data

Apr. 2, 2015   (DE) .................. 10 2015 105 104

(51) Int. Cl.
| | |
|---|---|
| *B62B 3/10* | (2006.01) |
| *B02C 17/10* | (2006.01) |
| *B02C 17/16* | (2006.01) |
| *B02C 17/18* | (2006.01) |
| *B66F 9/065* | (2006.01) |

(52) U.S. Cl.
CPC ............... *B62B 3/10* (2013.01); *B02C 17/10* (2013.01); *B02C 17/16* (2013.01); *B02C 17/18* (2013.01); *B66F 9/065* (2013.01)

(58) Field of Classification Search
CPC ......... B02C 17/16; B02C 17/18; B02C 17/10; B02C 13/02; B62B 3/02; B62B 3/10; B62B 3/0631; B62B 2202/30; B62B 5/0083; B66F 9/065; B66F 7/065; A47B 37/00; A23G 1/10; B62C 17/182
See application file for complete search history.

(56) References Cited

U.S. PATENT DOCUMENTS

| | | | | |
|---|---|---|---|---|
| 3,180,581 | A | * | 4/1965 | Velcheff .................. B02C 17/18 241/171 |
| 3,542,300 | A | * | 11/1970 | Ashdown ................ B02C 17/18 221/86 |
| 3,545,687 | A | * | 12/1970 | Mosby ...................... B01F 7/00 241/101.78 |

(Continued)

FOREIGN PATENT DOCUMENTS

| | | | |
|---|---|---|---|
| CN | 201427544 Y | * | 3/2010 |
| DE | 4419509 A1 | | 12/1995 |

(Continued)

OTHER PUBLICATIONS

Hosokawa Alpine, Alpine Agitate Ball Mill AHM Brochure, copyright 2010, retrieved Sep. 13, 2017 from https://www.hosokawa-alpine.com (Year: 2010).*

*Primary Examiner* — James A Shriver, II
*Assistant Examiner* — Steve Clemmons
(74) *Attorney, Agent, or Firm* — Whitmyer IP Group LLC

(57) ABSTRACT

The invention relates to a method and handling device for the maintenance of agitator ball mills with a horizontally disposed grinding container. The handling device comprises a transport means and at least one holding unit for machine parts of an agitator ball mill, wherein the transport means is connected to the holding unit in a detachable manner.

13 Claims, 4 Drawing Sheets

(56) References Cited

U.S. PATENT DOCUMENTS

| | | | | |
|---|---|---|---|---|
| 4,809,915 | A * | 3/1989 | Koffsky | A61M 5/3278 |
| | | | | 241/100 |
| 5,454,625 | A * | 10/1995 | Christensen | B62B 3/08 |
| | | | | 187/244 |
| 5,788,251 | A * | 8/1998 | Johnson | B62B 5/0083 |
| | | | | 280/35 |
| 6,431,319 | B1 * | 8/2002 | Myers | B62B 3/02 |
| | | | | 187/243 |
| 7,165,776 | B2 * | 1/2007 | Quinlan, Jr. | B66F 7/0625 |
| | | | | 211/207 |
| 7,188,843 | B2 * | 3/2007 | Magness | B25H 5/00 |
| | | | | 280/30 |
| 2003/0219323 | A1 * | 11/2003 | Shoup | B65D 19/06 |
| | | | | 410/31 |

FOREIGN PATENT DOCUMENTS

| | | |
|---|---|---|
| DE | 20202204 U1 | 3/2003 |
| DE | 202009005644 U1 | 9/2009 |

\* cited by examiner

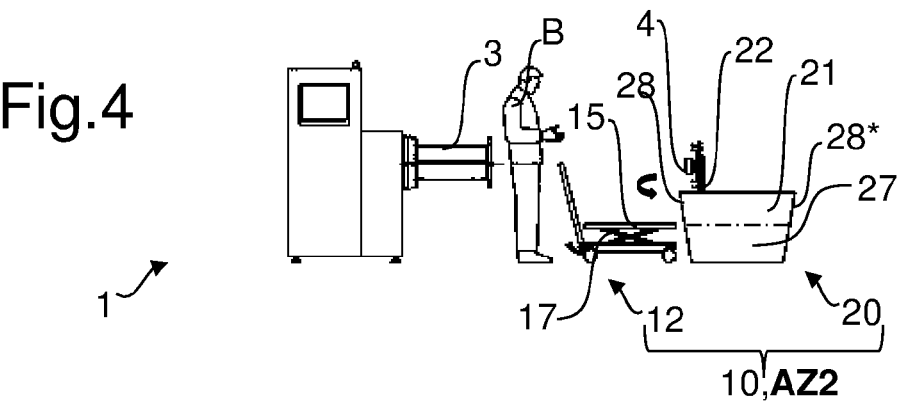
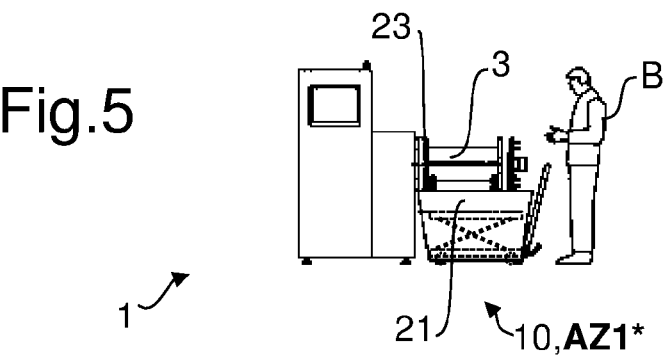
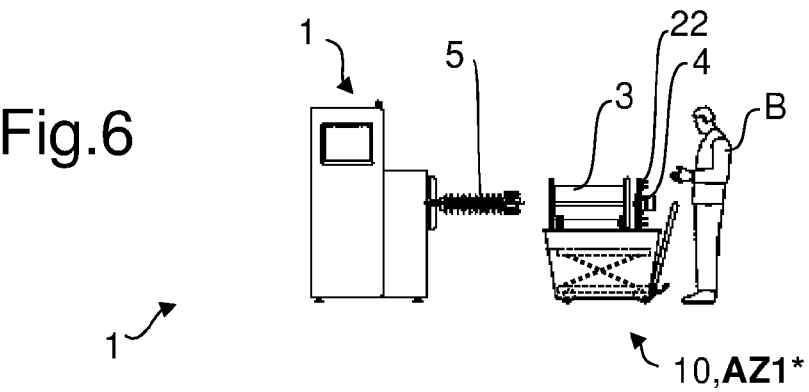

HANDLING DEVICE FOR THE MAINTENANCE OF AGITATOR BALL MILLS AND METHOD FOR MAINTAINING AN AGITATOR BALL MILL

TECHNICAL FIELD

The present invention relates to a handling device for the maintenance of agitator ball mills and a method for maintaining an agitator ball mill according to the features of the present invention.

BACKGROUND

The invention relates to the facilitated maintenance of agitator ball mills with a horizontally disposed grinding container.

As part of a product changeover, an exchange of the grinding bodies for example is required, since the size of the grinding bodies is matched to be given product to be ground. Furthermore, it may be necessary to detach the bottom of the grinding container and to have to remove the grinding container completely from the agitator shaft in order to carry out maintenance work on the latter for example. As a rule, it is only in the case of small laboratory mills that the user can easily detach the grinding container bottom and remove the grinding container bottom and the grinding container. In the case of larger mills, the weight of the grinding container bottom and the grinding container in particular pose a problem.

The use of ancillary frames for transporting parts of the agitator ball mill is thus known from the prior art, said ancillary frames being moved in particular by means of wheels. The user first detaches the grinding container bottom, places the latter on a first mobile ancillary frame and moves the latter to a storage location. The user then uses a second ancillary frame to transport the dismantled grinding container to a storage location. Or the user deposits the grinding container bottom at the storage location and uses the first ancillary frame in order then to remove the grinding container from the agitator ball mill and to store it externally.

In order to collect the grinding bodies which are discharged for example via the product outlet of the grinding container, grinding body chutes and grinding body collecting tanks are known from the prior art.

The problem of the invention consists in making available a handling device for facilitating the maintenance of agitator ball mills.

The above problem is solved by a handling device and a method for maintaining an agitator ball mill according to the features of the present invention.

SUMMARY

The invention relates to a handling device for the maintenance of agitator ball mills with any horizontally disposed grinding container. In particular, the grinding container has a cylindrical or conical shape. The handling device is intended in particular to make it easier for the user to dismantle and assemble the agitator ball mill and, if need be, to temporarily store machine parts of the agitator ball mill.

For this purpose, the handling device comprises a transport means so that the handling device can be positioned easily at suitable working locations and/or storage locations. Furthermore, the handling device comprises at least one holding unit for machine parts of the agitator ball mill. The transport means is connected detachably to the holding unit, so that the holding unit and the transport means can also be used individually when the need arises.

According to a particularly preferred embodiment of the invention, provision is made such that an operative connection is created between the holding unit and the transport means in a first working state of the handling device. In particular, the holding unit is disposed on the transport means in such a way that the holding unit and the transport means can be moved together.

Furthermore, the handling device can assume a second working state, in which the operative connection between the holding unit and the transport means is detached, so that the transport means can be moved independently of the holding unit.

According to an embodiment of the invention, provision can be made such that the holding unit comprises at least one holding device for at least one machine part of the agitator ball mill. For example, it can be a first holding device for the grinding container lid or the grinding container bottom of the agitator ball mill.

In particular, provision can be made such that the handling device is positioned at the agitator ball mill in such a way that the grinding container lid or the grinding container bottom is held by a first holding device of the handling device. After release of the fastening means, the grinding container lid or the grinding container bottom can easily be removed from the grinding container by the fact that the handling device with the detached grinding container lid or grinding container bottom is moved away from the agitator ball mill and into a new position.

Alternatively and/or additionally, a second holding device can be provided for the grinding container of the agitator ball mill. In particular, the second holding device can be constituted by a support, on which the grinding container rests and which prevents the grinding container from rolling away.

Furthermore, a third holding device can be constituted in particular as a box open at the top, or a holding trough, for the grinding bodies. For the maintenance of the agitator ball mill, for example for the maintenance of the agitator shaft, the grinding container bottom and the grinding container have to be removed. The grinding bodies present in the grinding container have to be discharged from the grinding container and collected in the course of dismantling, for which the holding trough is provided.

According to an embodiment of the invention, the first and/or the second holding device are disposed in particular in and/or on the holding trough. The first and/or the second holding device are particularly preferably disposed loose or detachable, so that the position of the first and/or second holding device can be adapted to the given agitator ball mill, in particular to the size of the grinding container of the agitator ball mill. If need be, provision can also be made to provide different holding devices for grinding containers of different size.

In this connection, it is conceivable to constitute the holding trough as an extractable trough, so that the size of a horizontal surface of the third holding device can also be adapted to the size of the grinding container.

According to an embodiment of the invention, provision is made such that the transport means of the handling device is height-adjustable. In particular, the transport means comprises a horizontal plane, wherein the height or vertical position of the horizontal plane can be adjusted in a variable manner. The stepless adjustment is possible for example by means of a scissor lifting mechanism. According to a preferred embodiment, the transport means is constituted has a scissor lift table with transport rollers.

According to an embodiment of the invention, provision is made such that the transport means in itself, i.e. without the operative connection with the holding unit, can be used for the holding and/or the transport and/or the temporary storage of at least one further machine part of the agitator ball mill. For example, at least one holding device for the agitator shaft of the agitator ball mill can be arranged on the horizontal plane of the transport means if need be.

According to an embodiment of the invention, the holding unit sits in the first working state at least partially on the horizontal plane of the transport means. Preferably, the holding trough sits on the horizontal plane of the transport means. In particular, the operative connection between the holding unit and the transport means is thus created. By means of a height adjustment of the transport means, the height of the holding unit in the first working state can also be adapted to the required working height for assembling or dismantling machine parts of the agitator ball mill.

In a second working state, the height of the horizontal support surface of the transport means is, in contrast, adjusted in such a way that a spacing is created between the horizontal plane of the transport means and the holding unit. In the second working state, the holding unit is constituted immobile. That is to say that, in the second working state, the holding unit of the handling device is arranged stationary at the given position. In contrast, the transport means in the second working state can be moved independently of the holding unit. In particular, it is possible to move the transport means by means of the transport rollers to different positions at the agitator ball mill or to distance it from the agitator ball mill.

The invention also relates to a method for the maintenance of an agitator ball mill using a handling device as described above. According to an embodiment of the invention, provision is made to advance at least one machine part of the agitator ball mill on the holding unit and to position it at a storage location and then to arrange at least one further machine part on the transport means detached from the holding unit.

For example, the procedure is as follows during the dismantling of an agitator ball mill for maintenance work with the aid of the handling device: The handling device is positioned at the agitator ball mill, so that the third holding device, in particular the holding trough for the grinding bodies, is arranged beneath the grinding container. A coarse outlet, for example, is opened on the grinding container and the grinding bodies present inside the grinding container are discharged.

The handling device is then pushed towards the agitator ball mill in such a way that the grinding container bottom is held by the first holding device. If need be, the height of the holding unit is also suitably adjusted by means of the height adjustment mechanism of the transport means.

For example, the first holding device can comprise suitable holding fixtures, into which parts of the grinding container bottom engage or suchlike. The fastening means for fixing the grinding container bottom to the grinding container are released by the user. The handling device is then moved at least so far away from the agitator ball mill that the grinding container bottom is removed from the grinding container.

A second holding device for positioning and/or fixing the grinding container can now be arranged on or in the third holding device and the handling device can in turn be positioned beneath the grinding container, in such a way that the first holding device can be raised from below towards the grinding container, so that the latter rests thereon. The fastening means for fixing the grinding container are now released. As a result of moving the handling device away, the grinding container is now removed from the agitator ball mill. The handling device can now be positioned by the user at a suitable temporary storage location.

By lowering the horizontal support surface of the transport means, the operative connection between the transport means and the holding unit is released. Whilst the holding unit is now disposed stationary at the temporary storage location, the transport means can be repositioned at the agitator ball mill.

In order to remove the agitator shaft, the horizontal support surface of the transport means is brought to a suitable height and a suitable forth holding device can for example be arranged on the horizontal support surface of the transport means. The fourth holding device is constituted such that the agitator shaft is fixed at least partially on the horizontal support surface, the fourth holding device in particular preventing the agitator shaft from rolling away on the horizontal support surface. After release of the fastening means for fixing the agitator shaft, the latter can be removed from the agitator ball mill by moving the transport means.

As an alternative to or in addition to the described features, the method can comprise one or more features and/or properties of the device described above. Alternatively or additionally, the device can also comprise individual or a plurality of features and/or properties of the described method.

The handling device according to the invention in particular facilitates the handling of machine parts of an agitator ball mill and/or the grinding bodies used in an agitator ball mill. In particular, the handling device permits the user facilitated dismantling of a plurality of heavy machine components of the agitator ball mill with a single ancillary device.

BRIEF DESCRIPTION OF THE DRAWINGS

Examples of embodiment of the invention and its advantages are explained below in greater detail with the aid of the appended figures. The size ratios of the individual elements with respect to one another in the figures do not always correspond to the actual size ratios, since some forms are represented simplified and other forms are represented enlarged in relation to other elements for the sake of better illustration.

FIGS. 1 to 7 show the use of a handling device according to the invention for the maintenance of an agitator ball mill.

Figure 1:
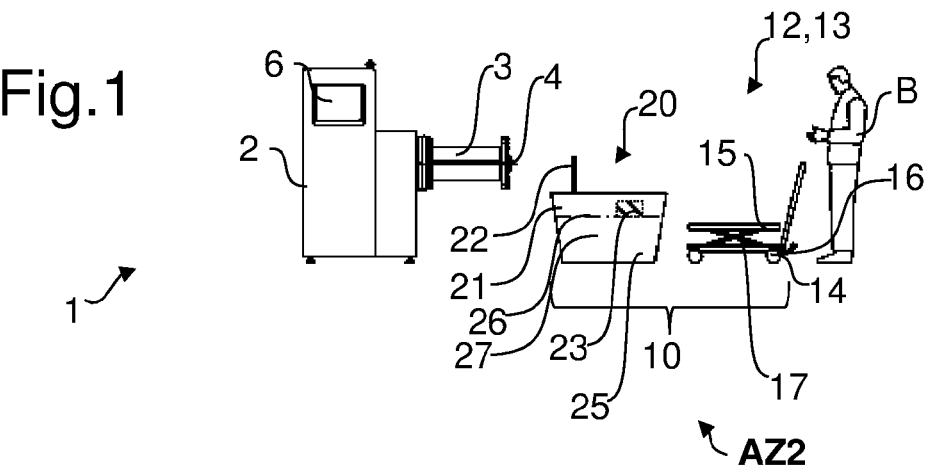

Identical reference numbers are used for identical or identically acting elements of the invention. Furthermore, for the sake of a clearer view, only reference numbers are represented in the individual figures that are required for the description of the respective figure. The represented embodiments only represent examples as to how the device according to the invention or the method according to the invention can be constituted and do not represent a conclusive limitation.

DETAILED DESCRIPTION

FIGS. 1 to 7 show the use of a handling device 10 according to the invention for the maintenance of an agitator ball mill 1, in particular for the at least partial dismantling of an agitator ball mill 1, for example as part of a repair or suchlike. An agitator ball mill 1 comprises a machine housing 2, in which the drive of the agitator ball mill 1 (not represented), the machine control and further machine components are disposed. A control panel 6 is provided for example on machine housing 2, by means of which control panel an agitator ball mill 1 can be controlled.

Agitator ball mill 1 also comprises a grinding container 3, in which the grinding process takes place. Grinding container 3 is constituted cylindrical and disposed horizontal, wherein one end of grinding container 3 can be fixed in various positions or orientations to machine housing 2. The opposite free end of grinding container 3, at which the product outlet is usually located, is closed with a container bottom 4. In order, for example, to carry out maintenance work on agitator shaft 5 (see FIGS. 6 and 7) of agitator ball mill 1, in the first place container bottom 4 and then grinding container 3 must be detached and removed from machine housing 2 of agitator ball mill 1.

In order to facilitate the handling of container bottom 4, grinding container 3 and agitator shaft 5 for user B, a handling device 10 is provided. The latter essentially comprises two functional units, in particular a transport means 12 and a holding and storage unit 20, which are each represented individually in FIGS. 1, 4, 7 and 8. FIGS. 2, 3, 5, 6 and 9 to 11, on the other hand, show handling device 10, wherein holding and storage unit 20 is disposed on transport means 12 in a detachable manner.

Transport means 12 is for example a type of scissor lift trolley 13 with wheels 14 and with an upper horizontal support surface 15. Furthermore, at least one adjustment means 16 is provided for operating and adjusting scissor lifting mechanism 17. By means of adjustment means 16, an arbitrary vertical level of horizontal support surface 15 can be adjusted using scissor lifting mechanism 17, i.e. horizontal support surface 15 can be positioned at different heights.

Holding and storage unit 20 comprises an upper holding trough 21, in particular for holding grinding bodies discharged from agitator ball mill 1, holding and storage unit 20 also comprising, in the represented example of embodiment, a first holding means 22 for container bottom 4 of agitator ball mill 1 and a second holding means 23 for grinding container 3 of agitator ball mill 1. Two parallel lateral boundary elements 25 of holding trough 21 project downwards beyond bottom 26 of holding trough 21, so that a hollow space 27 (see FIG. 8) is formed beneath holding trough 21. A third transverse boundary element of holding trough 21 disposed between the parallel lateral boundary elements can also be constituted projecting downwards beyond bottom 26 of holding trough 21. In contrast, a fourth transverse boundary element of holding trough 21 terminates in the downward direction, at least in sections, with bottom 26 of holding trough 21. Both third and fourth transverse boundary element 28, 28* (see FIGS. 8 and 11) preferably terminate in the downward direction, at least in sections, with bottom 26 of holding trough 21. As a result of elongated lateral boundary elements 25 in combination with at least one shortened transverse boundary element 28, 28* (see FIGS. 8 and 11), a hollow space 27 is formed beneath holding trough 21, said hollow space comprising at least one, preferably two side openings lying opposite one another.

The two parallel lateral boundary elements and optionally the third transverse boundary element in each case project in like manner downwards beyond the bottom and thus form a stand means. Alternatively and/or additionally, the use of feet at the points of intersection between the parallel lateral boundary elements and the third transverse boundary element or the region of the fourth lateral boundary element can be advantageous.

FIG. 1 shows handling device 10 in a second working state AZ2. In second working state AZ2, there is no operative connection between holding and storage unit 20 and transport means 12, so that transport means 12 can be arranged and moved independently of holding unit 20.

Transport means 12 is pushed from the forth side beneath holding trough 21. In particular, transport means 12 is pushed at least partially into hollow space 27 formed beneath holding trough 21. The height of horizontal support surface 15 of transport means 12 is then adjusted with the aid of adjustment means 16, in such a way that holding trough 21 rests at least in sections on horizontal support surface 15 and an operative connection thus exists between transport means 12 and holding and storage unit 20. This represents first working position AZ1 of handling device 10, as is represented for example in FIGS. 2 and 3. Horizontal support surface 15 is preferably raised still further, so that holding and storage unit 20 is additionally raised and no longer sits on the floor. Holding and storage unit 20 can now be displaced without problem together with transport means 12.

Figure 2:
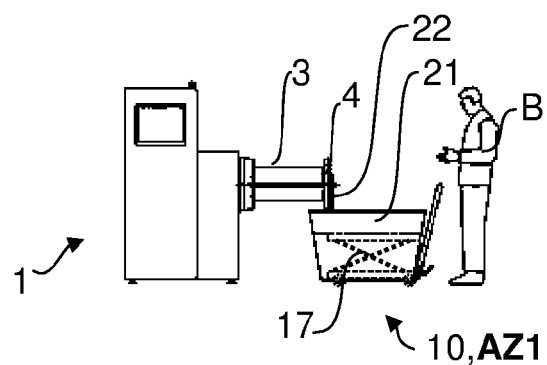
Figure 3:
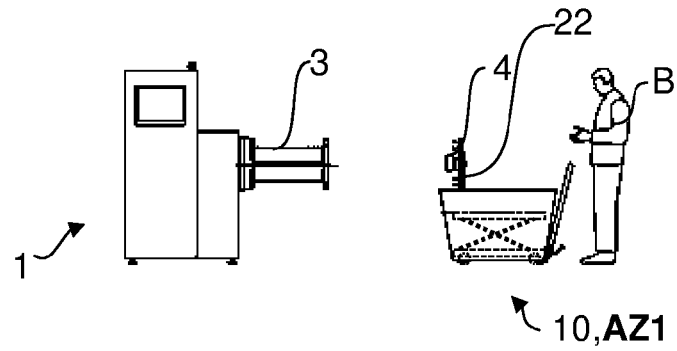

FIG. 2 shows the arrangement of a handling device 10 at an 11 agitator ball mill 1. Handling device 10 is positioned in such a way that container bottom 4 is held by holding means 22. For this purpose, it may be necessary to position holding and storage unit 20 at a suitable height by means of a scissor lifting mechanism 17 of the transport means. User B can release the fixing of container bottom 4 and remove the latter from grinding container 3 of agitator ball mill 1 by moving handling device 10 away (see FIG. 3). The grinding bodies exiting from grinding container 3 are thereby collected in holding trough 21. Alternatively, provision can be made such that grinding container 3 or container bottom 4 comprises an outlet opening (not represented) for discharging the grinding bodies, which is opened before removal of container bottom 4 and the grinding bodies are discharged from grinding container 3 in a controlled manner.

According to an embodiment represented in the figures, both transverse boundary elements 28, 28* (see FIGS. 8 and 11), which connect the two parallel lateral boundary elements 25 extended downwards, each terminate in the downward direction, at least in sections, with bottom 26 of holding trough 21. The mutually opposite openings of hollow space 27 are thus formed and transport means 12 can be pushed both from the side of third transverse boundary element 28 and also from the side of fourth transverse boundary element 28* into hollow space 27 beneath holding trough 21 of holding and storage unit 20.

According to a further embodiment (not represented), lateral boundary elements 25 extended downwards are disposed inclined with respect to one another and/or have a curved shape or suchlike, i.e. lateral boundary elements 25 do not necessarily have to be disposed parallel to one another.

According to FIG. 4, user B pushes handling device 10 with container bottom 4 arranged thereon into a work area at which sufficient space is present to allow handling device 10 to be rotated. He then lowers horizontal support surface 15 of transport means 12 with the aid of scissor lifting mechanism 17 and retracts transport means 12 beneath holding trough 21 of holding and storage unit 20. User B then moves transport means 12 from the opposite side beneath holding trough 21 of holding and storage unit 20 and restores, in accordance with FIG. 5, the operative connection between holding and storage unit 20 and transport means 12 by placing holding trough 21 onto horizontal support surface 15 by means of scissor lifting mechanism 17, so that handling device 10 now assumes an alternative first working state AZ1*.

Further holding means 23 (see FIG. 1) for grinding container 3 are provided inside holding trough 21. Alternatively, provision can be made such that holding means 23 for grinding container 3 are arranged in holding trough 21 by the user for this work step. Handling device 10, according to FIG. 5, is now positioned by user B at agitator ball mill 1 in such a way that grinding container 3 is held by holding means 23 in holding trough 21. User B can then release the fixings of grinding container 3 to agitator ball mill 1 and remove the latter, according to FIG. 6, by moving handling device 10, so that agitator shaft 5 is exposed.

Figure 7:
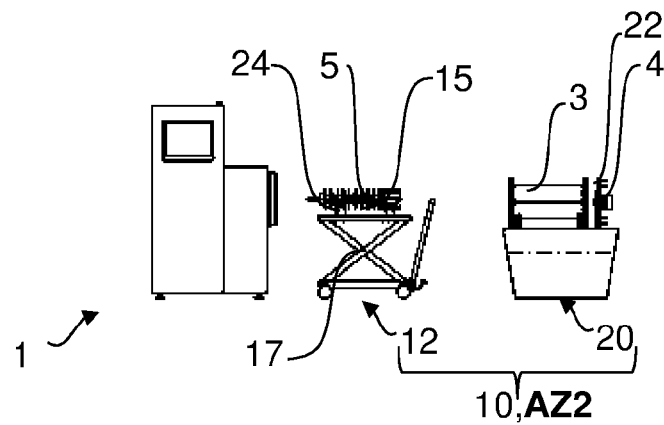

If, in a further work step, agitator shaft 5 is also to be removed from agitator ball mill 1, user B moves handling device 10 to a suitable storage location and releases the operative connection between transport means 12 and holding and storage unit 20. Holding and storage unit 20 remains at the storage location. According to FIG. 7, the user now positions holding means 24 for agitator shaft 5 on horizontal support surface 15 of transport means 12. In order to remove agitator shaft 5 and to position the latter securely by holding means 24 on horizontal support surface 15 of transport means 12, said support surface—as represented in FIG. 7—is brought to a suitable height by means of scissor lifting mechanism 17.

Figure 8:
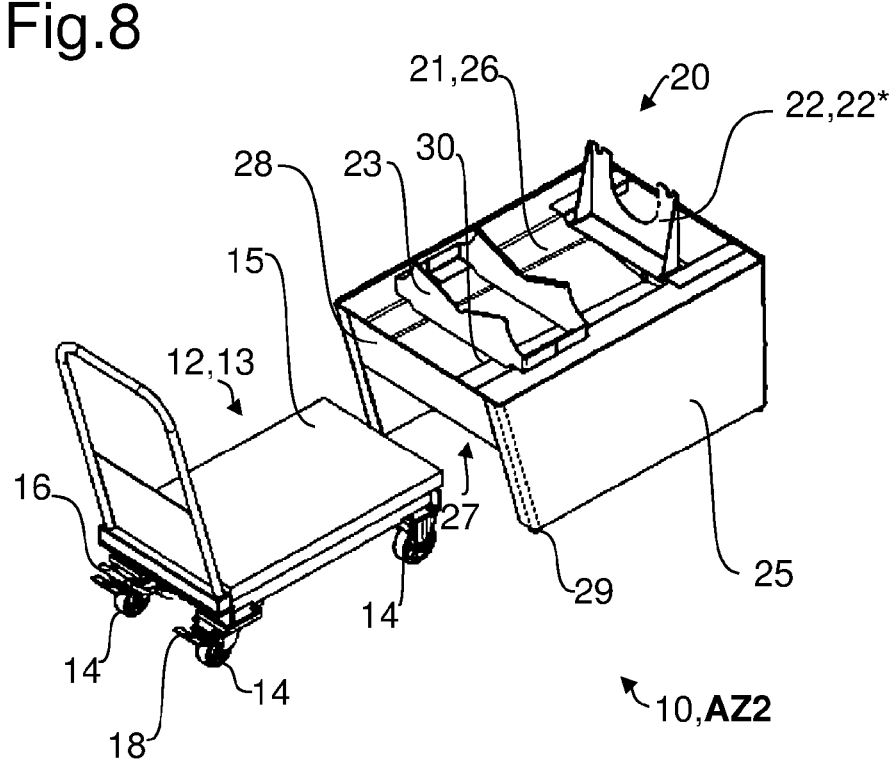
FIG. 8 shows a perspective representation of a handling device according to the invention in a second working state.

FIG. 8 shows a perspective representation of a handling device 10 according to the invention in a second working state AZ2, wherein the physical operative connection between holding and storage unit 20 and transport means 12 is removed (see FIGS. 1 and 4).

In particular, it can be seen in the representation that holding and storage unit 20 comprises a holding trough 21 with a holding means 22 for a container bottom (not represented) of an agitator ball mill 1 (see FIGS. 1 to 7). Holding means 22 is for example only inserted or placed into holding trough 21 (see also FIGS. 10 and 11). The position of holding means 22 can thus be adapted to the respective agitator ball mill to be maintained or holding means 22 can be duly replaced by another suitable holding means 22*.

Holding means 23 for the grinding container (not represented) are also shown. The latter are also preferably only inserted or placed in holding trough 21 and are thus variable in position. Furthermore, holding means 23 can simply be removed if necessary (see also FIGS. 10 and 11). It is also represented that two parallel lateral boundary elements 25 of holding through 21 are extended beneath a bottom surface 26 of holding trough 21, whilst connecting transverse faces 28 each for the most part terminate with bottom surface 26. A hollow space 27 is thus formed beneath bottom surface 26 and an opening is formed in each case beneath transverse faces 28, via which opening transport means 12 can be inserted at least partially into hollow space 27 beneath holding trough 21 of holding and storage unit 20.

Alternatively, provision can be made such that holding means 22, 22*, 23 can each be fixed by suitable securing means, for example by a screw connection or suchlike in or on holding trough 21, in order thus to prevent slipping during transport of container bottom 4 and/or grinding container 3.

In order to increase the stability of holding and storage unit 20 in the second working state (see FIGS. 1, 4 and 7), supporting feet 29 are also provided on holding and storage unit 20. Said supporting feet can each be adjustable in their height. Thus, for example, holding and storage unit 20 is thus able to gain a secure footing even on uneven ground.

Alternatively, provision can be made such that holding trough 21 is arranged on four legs like a table, so that transport means 12 can be pushed between the legs of holding and storage unit 20.

Transport means 12 is a scissor lift trolley 13 with wheels 14 and with an upper horizontal support surface 15. The scissor lifting mechanism, not visible in the representation, can be adjusted by an adjustment means 16. In particular, horizontal support surface 15 can be positioned at different heights.

Furthermore, fixing means 18 can be disposed on the wheels. Transport means 12 or handling device 10 can thus be secured against undesired movement in first working state AZ1 a desired location.

Figure 9:
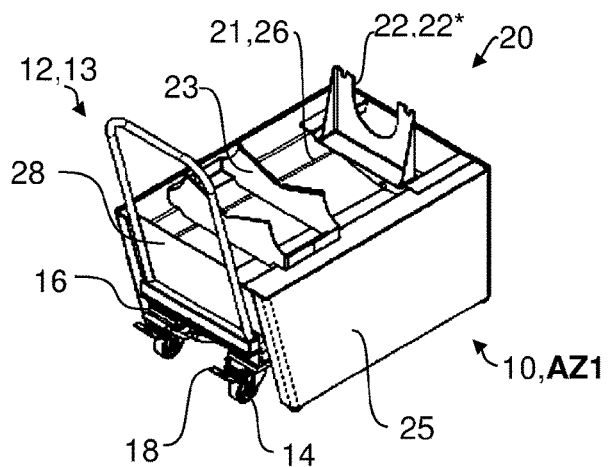
FIGS. 9 to 11 show various perspective representations of a handling device according to the invention in a first working state.
Figure 10:
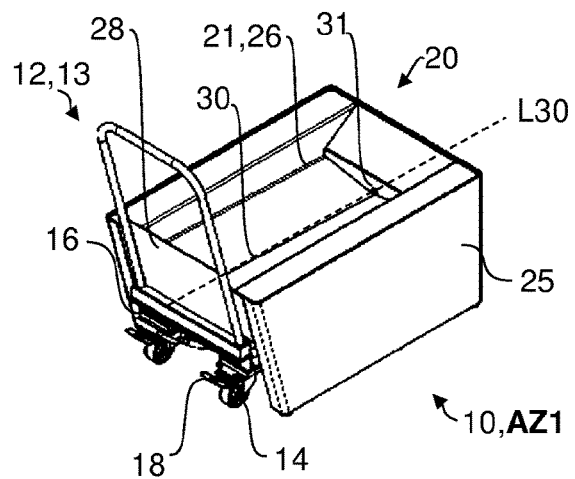
Figure 11:
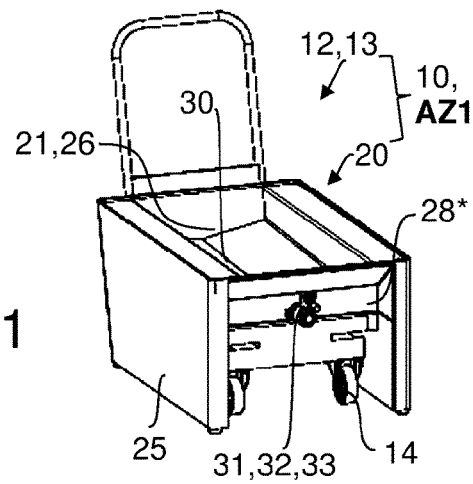

FIGS. 9 to 11 show various perspective representations of a handling device 10 according to the invention in a first working state AZ1. Reference is made to the description of FIGS. 1 to 8. In particular, holding means 22, 23 have been removed from holding trough 21 in FIGS. 10 and 11, for example so that holding means 22, 23 and/or holding trough 21 can be cleaned.

It can be seen in FIGS. 9 to 11 that holding trough 21 does not form a level surface, but rather forms a holding channel 30. In addition, the holding channel is inclined along its longitudinal axis L30 in the direction of discharge 31. The discharge is closed by a closure means 32, for example by means of a screw closure. The closure means is preferably disposed on a transverse boundary element 28*, which connects together the two lateral boundary elements 25. In order to remove from holding trough 21 the grinding bodies discharged from the grinding container of the agitator ball mill, discharge 31 is opened and the grinding bodies can be flushed out for example with water or another suitable means and collected in a suitable collecting container.

The invention has been described by reference to a preferred embodiment. A person skilled in the art can however imagine that modifications or changes to the invention can be made without thereby departing from the scope of protection of the following claims.

What is claimed is:

1. A handling device for the maintenance of agitator ball mills with a horizontally disposed grinding container, wherein the handling device comprises:
    a transporter; and
    a holding unit for machine parts of an agitator ball mill;
    wherein the transporter is connected to the holding unit in a detachable manner; and
    wherein the holding unit includes a first holding device for a grinding container lid of the agitator ball mill, a second holding device for grinding bodies of the agitator ball mill, and a third holding device for the grinding container of the agitator ball mill; and
    wherein the first holding device and the third holding device are arranged in and/or on the second holding device.

2. The handling device of claim 1, wherein the holding unit is disposed on the transporter in a first working state in such a way that the holding unit and the transporter are moved together.

3. The handling device of claim 2, wherein an operative connection between the holding unit and the transporter is released in a second working state, so that the transporter is moved independently of the holding unit.

4. The handling device of claim 2, wherein the transporter is height-adjustable.

5. The handling device of claim 4, wherein the transporter comprises a horizontal plane, wherein the height of the horizontal plane of transporter is adjustable.

6. The handling device of claim 5, wherein a holder and/or a positioner for an agitator shaft of the agitator ball mill is arranged on the horizontal plane of the transporter.

7. The handling device of claim 5, wherein the holding unit in the first working state sits at least partially on the horizontal plane of the transporter.

8. The handling device of claim 5, wherein the holding unit in the first working state is positioned at different heights by the transporter.

9. The handling device of claim 5, wherein a spacing between the horizontal plane of the transporter and the holding unit is formed in the second working state.

10. The handling device of claim 5, wherein the holding unit in the second working state is constituted stationary and wherein the transporter in the second working state is alone constituted mobile.

11. The handling device of claim 1, wherein a size of a horizontal surface of the second holding device is adjustable.

12. A method for maintaining an agitator ball mill, comprising:
    providing a handling device with a horizontally disposed grinding container, wherein the handling device comprises a transporter and a holding unit for machine parts of an agitator ball mill, wherein the holding unit includes a first holding device for a grinding container lid of the agitator ball mill, a second holding device for grinding bodies of the agitator ball mill, and a third holding device for the grinding container of the agitator ball mill;
    detachably connecting the transporter to the holding unit; and
    arranging the first holding device and the third holding device in and/or on the second holding device.

13. The method according to claim 12, further comprising:
    arranging at least one machine part of the agitator ball mill on the holding unit of the handling device; and
    arranging at least one further machine part of the agitator ball mill on the transporter released from the holding unit.

* * * * *